April 22, 1969 P. A. M. GELL ET AL 3,440,321

FURNACES FOR HEATING GLASS ELECTRICALLY

Filed July 6, 1966

INVENTORS
P. A. M. GELL
T. H. WATERWORTH
By *Murkelman*
AGENT

United States Patent Office 3,440,321
Patented Apr. 22, 1969

3,440,321
FURNACES FOR HEATING GLASS ELECTRICALLY
Philip Anthony Maunsell Gell, Enville, Stourbridge, Worcester, and Thomas Hugill Waterworth, Danesford, near Bridgnorth, Salop, England, assignors to Elemelt Limited, Bilston, England, a British company
Filed July 6, 1966, Ser. No. 565,651
Claims priority, application Great Britain, June 18, 1966, 27,314/16
Int. Cl. C03b *5/02*
U.S. Cl. 13—6                     9 Claims

ABSTRACT OF THE DISCLOSURE

A glass melting furnace in which rod-like electrodes project upwardly through raised block elements in the bottom wall of a substantially rectangular furnace chamber at positions spaced apart around a peripheral wall of the chamber and inset therefrom, there being electrodes at least at the corners. The glass is heated by alternating electric current applied to the electrodes from a supply circuit having a plurality of separate transformer windings for feeding respective phase voltages to peripherally non-adjacent electrodes. Intra-phase current flows along cross-current paths through the molten body of glass between peripherally non-adjacent electrodes while flow of current along peripheral current paths between peripherally adjacent electrodes is inter-phase current flowing between respective voltage sources. The glass is withdrawn downwardly through an opening of substantial area within the figure bounded by the electrodes.

---

This invention relates to furnaces for heating molten glass of the kind comprising a furnace chamber having a bottom wall and an upstanding peripheral wall for containing the glass in the molten state, electrodes disposed within the chamber and spaced apart in plan for passing current through the glass, and an electrical supply circuit for supplying alternating electric current to the electrodes. Such furnaces are herein referred to as being of the kind specified.

The term "glass" is used herein to mean vitreous materials generally.

One of the major problems which is encountered in melting glass utilising furnaces of the kind specified is to attain heating of the body of molten glass contained in the furnace chamber in as uniform a manner as possible.

One approach to this problem which has resulted in successful solution thereof is that disclosed in Patent No. 2,899,476 issued to Philip Anthony Maunsell Gell on Aug. 11, 1959, wherein the current is passed horizontally through the body of molten glass between two vertical arrays of electrode plates situated adjacent to opposite ends of the furnace chamber.

One of the limitations, however, of this solution is that it requires communication of current to the glass as uniformly as possible with respect to the current density at any given point in the vertical plane in which the electrode plates at each end of the furnace chamber lie, and this in turn is one of the main reasons for employing electrodes of the plate type. The distances between adjacent edges of successive plates of the electrodes at each end of the furnace chamber require to be kept to a minimum for this reason.

Arising out of this, however, it is necessary for all the electrodes at one end of the furnace chamber to be connected to the same pole of a single phase alternating current supply circuit and all the electrodes at the other end to be connected to the other pole thereof, otherwise due to the proximity of successive electrodes, large currents would pass between these in a region immediately adjacent to the end wall of the furnace chamber. The resulting local increase in glass temperature would not only be detrimental to the glass itself but would cause a greatly accelerated rate of erosion of the end wall of the furnace to be established. Additionally the array of electrode plates at each end of the furnace chamber defines, in combination with the adjacent end wall, a compartment which is open at the top and open at the bottom and in which quite vigorous convection currents can be established in the glass leading to an accelerated rate of erosion due to movement of the glass in contact with the end wall.

Moreover, most premises in which glass melting furnaces of the kind specified are operated are equipped with an electrical supply installation providing polyphase alternating current (usually three phase), this being derived from a power station serving the district in which the premises are situated. The loading of only a single phase of such an installation is objectionable electrically but, on the other hand, the equipment necessary to distribute a heavy single phase load uniformly to a polyphase installation represents a very substantial additional cost to the furnace as a whole.

The main object of the present invention is to provide a new or improved form of glass melting furnace of the kind specified which is better adapted to overcome these limitations than those hitherto available.

According to one aspect of the invention a furnace for heating molten glass comprises a bottom wall and an upstanding peripheral wall defining a furnace chamber of generally rectangular shape in plan for containing a body of glass to be heated, a plurality of elongated electrodes extending upwardly through said bottom wall at respective positions spaced apart peripherally of said chamber adjacent to the peripheral wall thereof and including electrodes situated adjacent to respective corners of said chamber, said electrodes collectively providing, through said glass, peripheral current paths between peripherally adjacent electrodes and cross-current paths between peripherally non-adjacent and non-colinear electrodes, supply circuit means for transmitting electrical current to said electrodes from a polyphase electrical supply source and including a plurality of voltage sources furnishing respective phase voltages of magnitudes and relative phases represented by voltage vectors corresponding at least approximately to lines joining those of said peripherally non-adjacent electrodes which are nearest to each other, conductor means connecting said voltage sources to respective pairs of the last said peripherally non-adjacent electrodes to provide for flow from said voltage sources of intra-phase currents to respective ones of said cross-current paths and inter-phase currents to respective ones of said peripheral current paths, outlet means for withdrawal of said molten glass including an opening in said bottom wall dimensioned to extend into an area bounded by said electrodes.

As a result of the isolation of the voltage sources which furnish the phase voltages the latter are capable of rising or falling to the same degree in voltage level at each of its output terminals with reference to a datum level of voltage (such as earth potential) to raise or lower the general level of one such voltage source relatively to another without altering the magnitude of the phase voltage furnished by the source itself. Such voltage sources include the secondary windings of the same or separate transformers and rotary, or static, electrical generators of alternating voltage which in each case are either entirely unconnected electrically with each other, otherwise than through the molten glass contained in the furnace chamber, or, if electrically connected with each other, are so connected by means which permit of the general rise or fall of voltage level of a particular one of the sources as a function of the resistance of conductive paths through the molten glass between the electrodes of the set.

It is known that due to the negative temperature coefficient of electrical resistance of glass passage of current therethrough from a source at which the voltage is maintained at constant value tends to instability since any increase in the temperature glass in the current path lowers its resistance and results in the passage of still greater current.

It is important to avoid development of such instability along the peripheral current paths since certain of these, and possibly all of them, may lie immediately adjacent to a portion of the peripheral wall of the furnace chamber. Erosion of the walls of the furnace chamber may be regarded as a gradual dissolution of the refractory material of which the peripheral walls in the molten glass and the rate of dissolution depends upon:

(a) the temperature of the glass immediately adjacent to such wall;
(b) the relative movement of the glass over the inner surface of such wall due to convection in the glass; and
(c) the chemical or composition of the glass.

Of these factors (a) tends to be stablised by confining the application of phase voltages to cross current paths and ensuring that only interphase voltages are applied along peripheral current paths for reasons hereinafter more fully explained.

The employment of elongated or rod-type electrodes extending upwardly through the bottom wall of the furnace chamber at relatively large spacings between peripherally adjacent electrodes avoids setting up compartments between the electrodes and the adjacent portion of the peripheral wall in which convection currents having too rapid or vigorous a flow tend to be established. At the same time, due to the ability to achieve stable flow of current in the peripheral current paths and, with certain arrangements, to reduce the peripheral current well below that existing in the cross current paths, the required uniformity of heating is still maintained in the body of glass contained within the polygonal figure defined by the electrodes but without the necessity, as heretofor, of erecting continuous or nearly continuous arrays of plate-like electrode bodies at opposite ends of the furnace chamber.

Still another object of the invention is to avoid or reduce erosion of the bottom wall of the furnace chamber.

With this object in view and according to another aspect of the invention, there is provided a furnace of the kind specified wherein the electrodes, preferably of the rod-type, extend upwardly through the bottom wall of the furnace chamber and the latter incorporates portions which are raised locally where the electrodes project through it.

The bottom wall of the furnace preferably incorporates block elements which are structurally separate from the remainder of the bottom wall and which are disposed at each position at which the electrodes project upwardly through the bottom wall, such block elements themselves being apertured to permit of passage therethrough of the electrodes.

The invention will now be described, by way of example, with reference to the accompanying drawings wherein.

Figure 1:
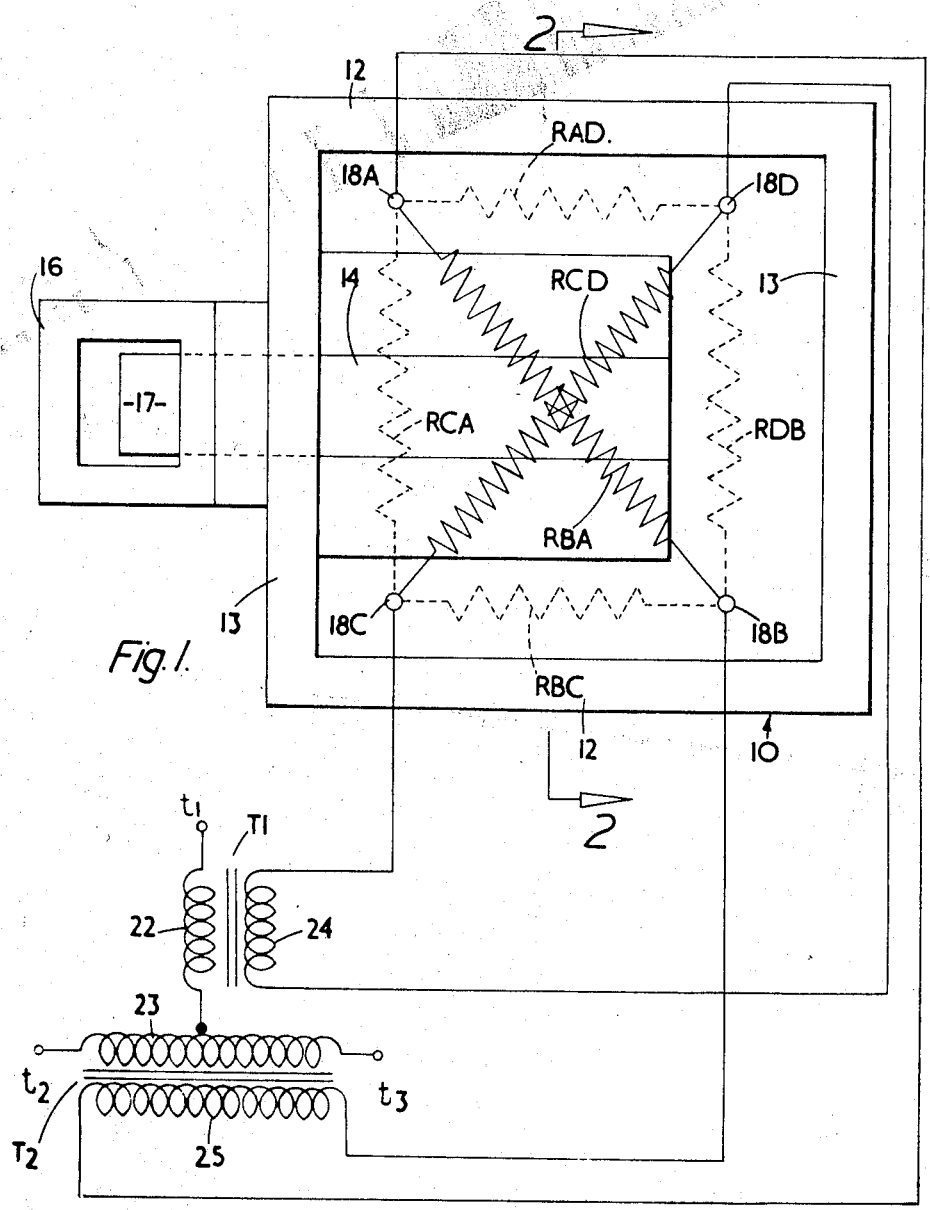
FIGURE 1 is a diagrammatic plan view of one embodiment of furnace of the kind specified incorporating the invention.
Figure 2:
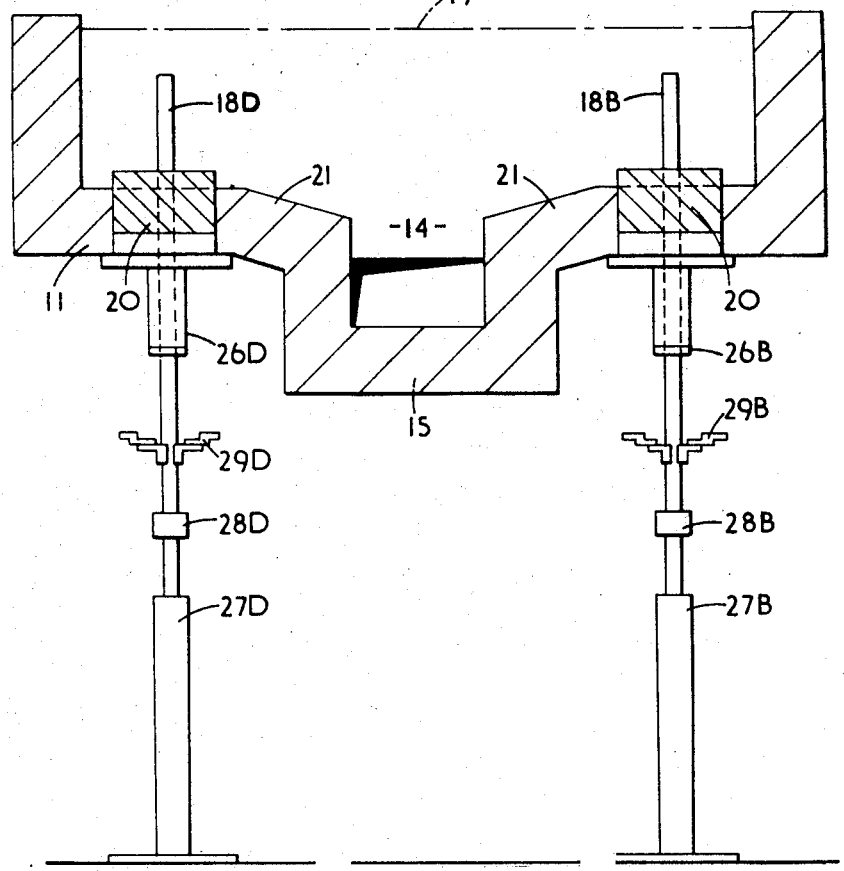
FIGURE 2 is a view in transverse cross-section on the line 2—2 of FIGURE 1.

Referring firstly to FIGURES 1 and 2, the furnace illustrated diagrammatically therein may be generally as described and illustrated in Patent No. 2,899,476 issued to Philip Anthony Maunsell Gell on Aug. 11, 1959 except for certain modifications in the form and arrangement of electrodes employed therein and in the supply circuit for feeding current to the electrodes.

The furnace chamber 10 may be a rectangular form having a bottom wall 11 and lateral walls including two end walls 12 and two side walls 13 formed of any suitable refractory material.

In the bottom wall is formed an opening 14 which communicates with a duct 15 conveniently of channel-section underlying the bottom wall and extending therebeneath to one side of the furnace chamber 10. The duct communicates at its opposite end with a further chamber 16 by way of an opening 17 in the bottom wall thereof and from the further chamber 16 glass may be fed out through one or more feeder chambers communicating therewith either directly or through the intermediary of ducts (not shown).

It will be understood that in the form illustrated the chamber 10 is utilised for the melting of batch materials to form a body of molten glass in the chamber 10, such batch materials being fed into the chamber 10 in any suitable manner as, for example, by a batch charger.

Disposed in the chamber 10 are a plurality of electrodes designated 18A to 18D. The electrodes 18A and 18D are disposed at horizontally spaced positions along and adjacent to one of the end walls 12, and the electrodes 18C and 18B are similarly positioned in relation to the other end wall 12 so that collectively the electrodes lie at the corners of a rectangle.

The electrodes 18A to 18D are of the rod type.

Such electrodes may thus comprise a stem in the form of molybdenum rod of which the inner end portion projects into the interior of the furnace chamber to constitute the electrode body from which current is communicated to molten glass therein, the normal level of the latter being indicated at 19.

Each electrode rod such as 18D is capable of sliding movement relatively to a gland structure such as those indicated at 26D and 26B and is supported in a given vertical position in each case by a jack 27D, 27B and an intervening heat insulating element 28D, 28B. The electrode rod bears an electrical connector 29D, 29B in the form of a clamp.

The arrangement permits adjustment of the position of the upper end of the electrode rod relative to the normal level 19 of molten glass on which a crust batch materials may float. This is important to ensure that there is an adequate rate of melting of the solid state batch constituents from the underside of the batch crust but not so high a rate as to cause the batch crust to be rendered thin and hence ineffective as a heat insulator, since this would produce greater heat loss from the furnace to the detriment of its efficiency. The rate of melting of batch crust varies with different compositions of glass and hence the vertical adjustable electrode rods are especially advantageous in adapting the furnace to different compositions of glass.

The part of the bottom wall through which each electrode 18A to 18D projects is preferably constituted by a structurally separate block element 20, the upwardly presented face of which is raised relatively to the remainder of the upper surface of the bottom wall.

At each end of the opening 14 the bottom wall includes a downwardly and inwardly inclining portion 21 starting at a position approximately midway between one boundary of the opening 14 and the adjacent pair of electrodes 18A, 18D or 18C, 18B as the case may be.

Current is fed to the electrodes 18A to 18D from a polyphase electrical current supply system which may be the mains supply available in the area in which the furnace is in operation. In this case such system would normally be a three phase supply system.

The current is fed from this system to the electrodes through the intermediary of a supply circuit including transformers $T_1$, $T_2$ both of the single phase type having their primary windings 22 and 23 connected to form a Scott connection affording input terminals $t1$, $t2$ and $t3$ for the three supply phases. The transformers $T_1$, $T_2$ are themselves connected to the supply mains through buck-boost regulator means. These may comprise saturable reactors or variable auto-transformers. The latter may have motor driven slide contacts. The turns ratio of each of the transformers is selected to provide two phase voltages of equal magnitude in quadrature across the secondary windings 24, 25 respectively.

The transformers have secondary windings 24 and 25 of which the first is connected to the diagonally opposed electrodes 18C and 18D and the second is connected to the diagonally opposed electrodes 18A and 18B.

Figure 3:
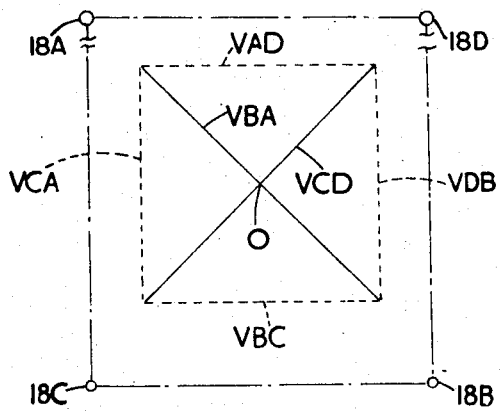
FIGURE 3 is a vector diagram illustrating the voltage relationships between the electrodes of the furnace.

The voltages furnished by the secondary windings 24 and 25 are equal to each other as represented by the phase voltage vectors $V_{BA}$, $V_{CD}$ in FIGURE 3.

The secondary windings 24 and 25 are unconnected electrically to each other externally of the furnace chamber and in the absence of any conductive paths which exist through the molten body of glass in the furnace chamber, the voltage vectors $V_{BA}$ and $V_{CD}$ would have a relationship (as represented by the voltage difference between the centre points of the two secondary windings 24 and 25) determined by the relative resistance values of the earth leakage paths, if any, from the windings 24 and 25 and the circuits to which they are connected, as well as by any stray capacitive current paths between the two sub-circuits.

In practice, however, electrically conductive paths do exist through the molten body of glass. In the sub-circuit which contains the secondary winding 24 the electrically conductive cross path is represented by the full line resistance $R_{CD}$ and in the sub-circuit containing the secondary winding 25 the corresponding path is represented by the full line resistance $R_{BA}$.

The resistive peripheral paths which join the two sub-circuits through the molten bodies of glass are represented by broken line resistors $R_{AD}$, $R_{DB}$, $R_{BC}$ and $R_{CA}$ respectively.

In operation electrical current traverses the main central body of glass at the perimeter of which the electrodes 18A to 18D are situated, the cross current paths being diagonal as represented by $R_{BA}$ and $R_{CD}$.

Current will, however, flow peripherally along the paths represented by the broken line resistors in FIGURE 1 which are reproduced for convenience in FIGURE 3 by the chain lines joining electrodes 18A to 18D.

If the electrodes 18A to 18D were sited at the corners of a polygonal figure having identity of shape with the polygonal figure within which the voltage vectors $V_{BA}$, $V_{CD}$ are drawn then the magnitude of the interphase voltages between the electrodes would be represented by the sides of the square, as indicated at broken lines $V_{CA}$, $V_{AD}$, $V_{BA}$, $V_{BC}$.

For phase voltages in quadrature the interphase voltage has a value which is the square root of the sum of half the values of the phase voltages. Where these are equal the ratio of phase voltage to interphase voltage is thus 1.41:1.

In practice it is not essential to adhere to strict identity between the polygonal figure constructed by joining the electrodes 18A to 18D and the polygonal figure within which the voltage vectors $V_{BA}$ and $V_{CD}$ are drawn as shown. For example, as shown, the polygonal figure within which the voltage vectors $V_{BA}$ and $V_{CD}$ are drawn is a square, whereas the polygonal figure constructed by joining the electrodes 18A through 18D is a rectangle in which the shorter sides are shortened by some 17% relative to the longer sides. It is possible, however, for a larger departure to be tolerated in which the electrodes are situated at the corners of a rectangle in which the shorter sides are shortened relatively to the longer sides by 20%. This results in the ratio of the diagonal of the rectangle to each of the shorter sides thereof being 1.77:1.

This departure is possible because of the inherent stability of current, and hence heating, produced along the peripheral current paths by the use of interphase voltages. This arises in the following way. If, for example, some external influence increases the glass temperature, for example between electrodes 18A, 18D the resistive value of this path will decrease and the magnitude of the interphase voltage $V_{AD}$ will decrease, thereby producing a reduction in the current along this path.

Expressed in another way, the voltage vectors $V_{BA}$ and $V_{CD}$ tend to remain in the geometrical relationship indicated in FIGURE 3 in which they interset each at their midpoints.

Any disturbance of glass temperature from a particular one of the current paths tends to shift the crossing point, 0, for voltage vectors $V_{BA}$ and $V_{CD}$ in a direction to shorten the interphase voltage applied along the peripheral current path concerned automatically to compensate for the disturbance.

Consequently it is possible to place the electrodes quite near the peripheral wall of the furnace chamber without encountering the risk of damage since local overheating in peripheral margin paths, due to the usual instability, is avoided.

The electrode positions may be selected to provide peripheral current paths which are in a range of 1 ft. 6 ins. to 2 ft. 6 ins. from the adjacent portion of the peripheral wall of the furnace chamber according to the position of the glass required to be heated therein.

It will further be understood that more than one set of electrodes illustrated in FIGURES 2 and 3 may be employed.

In such an arrangement two parallel rows of electrodes disposed adjacent to opposite portions of the perimeter and each containing three or more electrodes would be spaced apart ideally by the same distance as the spacing between electrodes in each row, the electrodes being thus situated at the corners of a succession of square figures having adjacent sides in common.

Figure 3A:
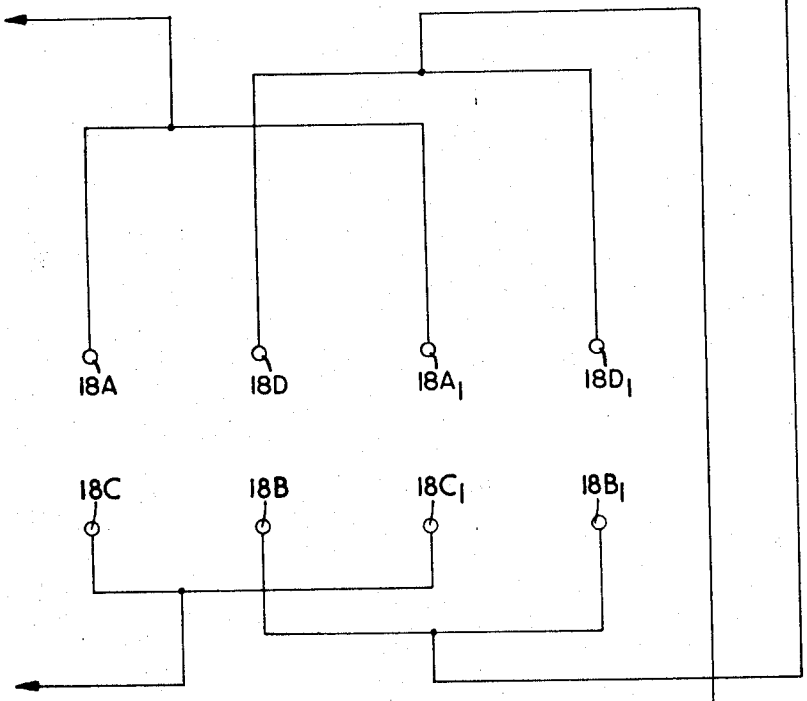
FIGURE 3A is a vector diagram illustrating a modified electrode arrangement embodying two parallel rows of electrodes.

The phase voltage $V_{AB}$ would then be applied across some or all of one set of parallel diagonals of the squares, and the phase voltage $V_{CD}$ across some or all of the other set of parallel diagonals, as shown in FIGURE 3A wherein the additional electrodes 18A, 18B, 18C, 18D are strapped electrically to electrodes designated by corresponding letters $18A_1$, $18B_1$, $18C_1$, $18D_1$.

It will be further noted from FIGURES 1 and 2 that the opening 14 is dimensioned in one direction, namely lengthwise of the channel 15, to span at least the major proportion of the distance between the end walls 13 of the furnace chamber and that in a direction at right angles to the length of the channel the dimension of the opening 14 is more than one-eighth of the distance between the end walls 12 of the furnace chamber. Accordingly any concentrated downward pull on the molten body of glass traversed by the cross-current paths between diagonally opposed electrodes is avoided, and glass tends to be withdrawn uniformly in a downward direction from this body, thereby creating little or no local disturbance of the relative values of resistance presented by the cross-current paths.

Although the invention has been described herein, as applied to a glass melting furnace of the kind specified, as the sole means of heating the glass it is to be understood that the invention is not so limited and may be employed for supplying additional heat to glass in a furnace wherein other heating means are also provided. Such other heating means may comprise burners disposed above the glass and fed with a fossil fuel, e.g., gas or oil.

What we claim then is:
1. A furnace for heating molten glass comprising:
   (a) a bottom wall and an upstanding peripheral wall defining a furnace chamber for containing a body of glass to be heated,
   (b) a plurality of electrodes in said chamber at positions spaced peripherally apart along and inset from said peripheral wall, and each including an electrode body of rod-like form extending upwardly through said bottom wall, and
   (c) raised portions in said bottom wall where said electrodes extend upwardly therethrough and having upwardly presented faces disposed above the remainder of said bottom wall, said raised portions comprising block-like elements structurally separate from the remainder of said bottom wall, and said block-like elements being of a refractory material more highly resistant to erosion by the glass than that of which said remainder of said bottom wall is formed.
2. A furnace for heating molten glass comprising:
   (a) a bottom wall and an upstanding peripheral wall defining a furnace chamber of generally rectangular shape in plan for containing a body of glass to be heated,
   (b) a plurality of elongated electrodes extending upwardly through said bottom wall at respective positions spaced apart peripherally of said chamber adjacent to the peripheral wall thereof and including electrodes situated adjacent to respective corners of said chamber, said electrodes collectively providing, through said glass, peripheral current paths between peripherally adjacent electrodes and cross-current paths between peripherally non-adjacent and non-colinear electrodes,
   (c) supply circuit means for transmitting electrical current to said electrodes from a polyphase electrical supply source and including
      (i) a plurality of voltage sources furnishing respective phase voltages of magnitudes and relative phases represented by voltage vectors corresponding at least approximately to lines joining those of said peripherally non-adjacent electrodes which are nearest to each other,
      (ii) conductor means connecting said voltage sources to respective pairs of the last said peripherally non-adjacent electrodes to provide for flow from said voltage sources of intra-phase currents to respective ones of said cross-current paths and inter-phase currents to respective ones of said peripheral current paths, and
   (d) outlet means for withdrawal of said molten glass including an opening in said bottom wall extending into an area bounded by said electrodes.
3. A furnace as claimed in claim 2 wherein:
   (a) said furnace chamber is of square shape in plan,
   (b) said electrodes are situated exclusively adjacent to respective corners of said chamber,
   (c) said voltage sources furnish respective phase voltages which are substantially equal to each other and are substantially in quadrature with each other.

4. A furnace as claimed in claim 3 wherein the peripheral spacing between the electrodes of any one peripherally adjacent pair is within a range of equality to 20% less than the peripheral spacing between the electrodes of any other of the peripherally adjacent pairs.
5. A furnace as claimed in claim 2 wherein:
   (a) said electrodes include a plurality of sets thereof each containing four electrodes situated at the corners of a respective rectangular figure,
   (b) said rectangular figures are spaced apart from each other in a direction parallel to a longer dimension of the furnace chamber such that the electrodes collectively form two rows extending substantially parallel to and adjacent to respective opposed wall portions of said peripheral wall which are parallel to said longer dimension of said chamber,
   (c) alternately positioned electrodes in each of said rows are connected electrically by said conductor means to each other,
   (d) said voltage sources are two in number and furnish respective phase voltages which are substantially equal to and are substantially in quadrature with each other, further ones of said conductor means connecting one of said voltage sources to one pair of diagonally opposed electrodes of each set, and the other one of said voltage sources to the other pair of diagonally opposed electrodes of each set.
6. A furnace as claimed in claim 2 further including means for preventing transmission of current from said electrodes to said molten glass over a distance upwardly of said electrodes from said bottom wall to provide raised ends relative to said bottom wall to the lowest element or sub-division of the cross-current path or peripheral current path as appropriate extending between said electrodes.
7. A furnace as claimed in claim 6 wherein said means for preventing transmission of current from said electrodes to said molten glass over a distance upwardly of said electrodes from said bottom wall comprises for each of said electrodes a block-like element enveloping the lower portion of said electrode, said block-like element being structurally separate from the remainder of said bottom wall and made from a material more highly resistant to erosion by said molten glass than that of which said remainder of said bottom wall is formed.
8. A furnace as claimed in claim 6 wherein said bottom wall has an upwardly presented surface which includes portions which incline downwardly in a direction from said peripheral wall towards said opening in said bottom wall.
9. A furnace as claimed in claim 2 wherein said voltage sources are unconnected electrically with each other otherwise than through said body of glass.

References Cited

UNITED STATES PATENTS

| | | | |
|---|---|---|---|
| 2,018,885 | 10/1935 | Ferguson | 13—6 |
| 2,313,217 | 3/1943 | Borel | 13—6 |
| 2,516,570 | 7/1950 | Hartwig et al. | 13—6 XR |
| 2,993,079 | 7/1961 | Augsburger | 13—6 |

BERNARD A. GILHEANEY, *Primary Examiner.*

HIRAM G. GILSON, *Assistant Examiner.*

U.S. Cl. X.R.

13—20, 24